United States Patent
Kobayashi et al.

[11] Patent Number: 5,419,284
[45] Date of Patent: May 30, 1995

[54] EXHAUST-GAS FULLY FIRED TYPE BOILER AND METHOD OF WASTE HEAT RECOVERY USING THE SAME

[75] Inventors: Hiroshi Kobayashi; Yoshiharu Ueda; Masamichi Yamamoto; Keiryo Tou, all of Yasu; Seikan Ishigai, Ashiya; Sentaro Miura; Kiyoshi Furushima, both of Tokyo, all of Japan

[73] Assignee: Hirakawa Guidom Corporation, Osaka, Japan

[21] Appl. No.: 156,975

[22] Filed: Nov. 24, 1993

Related U.S. Application Data

[63] Continuation of Ser. No. 922,463, Jul. 30, 1992, abandoned.

[30] Foreign Application Priority Data

Sep. 3, 1991 [JP] Japan .................... 3-253024

[51] Int. Cl.$^6$ ............. F02C 6/00; F02C 7/02; F27D 17/00
[52] U.S. Cl. .................... 122/7 B; 431/5; 110/212; 60/39.5; 60/39.182
[58] Field of Search ............ 122/7 B; 431/5; 110/212, 213; 60/39.5

[56] References Cited

U.S. PATENT DOCUMENTS

| | | | |
|---|---|---|---|
| 1,925,646 | 9/1933 | Rabestraw | 122/7 B |
| 3,848,549 | 11/1974 | Pryor et al. | 110/212 |
| 3,861,334 | 1/1975 | Stockman | 110/212 |
| 5,101,772 | 4/1992 | Bruhn | 431/5 |

FOREIGN PATENT DOCUMENTS 417610  10/1934  United Kingdom ............... 122/7 B Primary Examiner—John K. Ford
Attorney, Agent, or Firm—Wenderoth, Lind & Ponack

[57] ABSTRACT

A waste heat recovery method can provide heat recovery from exhaust gases, full firing of exhaust gases, and auxiliary burning, either simultaneously or independently. Such method is carried out by installing a tube-nested (or heat-absorbing water tube furnace-inserted type) combustion chamber in a boiler of a cogeneration system or combined cycle system or the like which generates both heat and power. The boiler is provided with a combined full firing burner and auxiliary burner confronted by the exhaust gas entrance. This structure allows for elimination of a separate auxiliary chamber and thus has made it possible to provide a waste heat boiler of a simplified structure which is smaller in size and thus occupies less space, at a reduced price and with a greatly expanded heat-to-electricity ratio. Accordingly, the boiler of the invention has a greatly extended range of applications.

4 Claims, 2 Drawing Sheets

EXHAUST-GAS FULLY FIRED TYPE BOILER AND METHOD OF WASTE HEAT RECOVERY USING THE SAME

This application is a continuation of now abandoned application, Ser. No. 07/922,463, filed on Jul. 30, 1992.

BACKGROUND OF THE INVENTION AND RELATED ART STATEMENT

1. Field of the Invention

The present invention relates to a waste heat boiler which is simple in structure and small in size so as to occupy only a small space, and which has an extended range of heat-to electricity ratios which allows it to be used in a wide range of applications. The boiler is effective to carry out three functions, i.e. heat recovery, full firing of exhaust gas, and a new (or auxiliary) burning, in connection with or independently of a heat-absorbing water tube furnace-inserted type combustion chamber (hereinafter referred to as a tube-nested combustion chamber), which was invented by one of the applicants for the present invention, applied to waste heat recovery equipment such as a cogeneration system (combined heat and power generation) or a combined cycle system (combined power generation). The invention further relates to a method of waste heat recovery using the aforementioned boiler.

2. Description of the Prior Art

Heretofore, in the so-called cogeneration systems or combined cycle systems which utilize heat engines, the use of a waste heat recovery boiler has always been necessary for recovering waste heat therefrom. There have been available two basic arrangements for installing the boiler into the system.

In a first such arrangement, an exhaust-gas heat recovery boiler is installed so as to attain the greatest possible heat recovery from the exhaust gas derived from the engine or gas turbine.

In this first arrangement, the recoverable waste heat quantity or the steam generation is limited, relative to the quantity of electric power to be generated (or output), by the so-called pinch point concept wherein the exhaust gas temperature cannot be lowered below the saturation temperature of the boiler. Accordingly, the ratio of the calories generated to the electric power produced, that is, the so-called heat-to-electricity ratio, is fixed.

On this account, there has been a problem that the utilization of this system is restricted by the fixed nature of the heat-to-electricity ratio because certain users, such as hotels, petroleum refineries and the like, require high heat-to-electricity ratios whereas other users, such as offices, cement industries and the like, require low heat-to-electricity ratios. Thus, in order to expand the range and objects of its application, it has been demanded that the range of the heat-to-electricity ratio be expanded in the cogeneration or combined cycle systems.

A second arrangement, on the other hand, is such that the heat portion of the heat-to-electricity ratio can be arbitrarily changed by charging and burning additional fuel and air (i.e. auxiliary burning) in an auxiliary chamber provided to the waste heat boiler of the first arrangement. This second arrangement is being successfully put into practical use.

In improving the heat-to-electricity ratio in the cogeneration system or the combined cycle system as described above, the systems have resorted, in large part, to upgrading the efficiency of an engine or an electric power generator in generating electricity. As this efficiency increases, the heat portion of the ratio decreases relative thereto, and causes the heat-to-electricity ratio to diminish down to a limited constant value.

To remedy this situation, it has been proposed to increase the heat portion. A method which has been commonly employed for this purpose utilizes a duct burner (CD), as shown in the schematic-diagram of FIG. 2, installed at the entrance of the aforementioned heat recover boiler B, and a necessary amount of fuel 7 is charged into the duct burner CD and then burned by exhaust gas.

In this instance, the exhaust gas from an ordinary gas turbine contains about 15–16% oxygen. By charging the necessary amount of fuel 7 into the duct burner CD, the calorie production can be increased 1–5 fold relative to that of the exhaust gas recovery alone (i.e. without utilizing the duct burner).

The duct burner of this type needs to be installed between the exit of a heat engine (e.g. a gas turbine (GT)) and the waste heat boiler (B). This burner is typically large and since the $O_2\%$ in the exhaust gas is lower than that in the ambient air, its flame is considerably elongated, but according to a traditional regulation, there is a requirement that this flame should not reach the heating surface of the waste heat boiler (B). Thus, a substantially larger space has been required by the addition of the duct burner (CD).

Among the requirements to meet the demand for expanding the range of the heat-to-electricity ratio, steam generation is often required even when there is no power demand. Actually, it is an essential requirement of the waste heat boiler of this type that the three types of functions are provided, including generation of steam by use of only ordinary fuel, as well as the recovery of exhaust-gas as mentioned above with respect to the first type of arrangement and full firing of the exhaust gas as mentioned above with respect to the second type of arrangement.

However, with the conventional waste heat boiler of this type, it was impossible to fully meet the aforementioned requirements.

More specifically, in the prior art exhaust-gas fully fired type boiler B, it has been necessary to provide a duct burner as a combustion chamber for burning the fuel in order to provide the functional requirements mentioned above, as shown in the schematic diagram of FIG. 2. Thus, the provision of a space for installation of the combustion chamber (i.e. duct burner) was always necessary. It has also been necessary in the prior art, in order to allow for the generation of steam when the heat engine (e.g. gas turbine) is not in operation or is only slightly operating and thus producing little or no exhaust gases, to provide the boiler B with an auxiliary combustion chamber 3 (see FIG. 4B) and an auxiliary burner device 4 for providing auxiliary burning of auxiliary fuel 41 and air 42. The need to provide this auxiliary chamber 3 has also added to the space requirements of the system.

FIG. 2 is a schematic diagram of a conventional gas turbine cogeneration system, showing a compressor CP into which Air A is supplied, a combustor CB into which Fuel F is supplied, a gas turbine GT, the duct burner CD, a duct D, the boiler B and a denitrator $DNO_x$. The boiler B shown in FIG. 2 is, for example, a water-tube type waste heat boiler (B), as shown in FIG. 3, which is used as a simple waste heat boiler.

FIG. 3 shows a boiler B which includes therein water cooled wall tubes 1 and water tubes 2.

The conventional gas turbine cogeneration system of FIG. 2 is so designed that the fuel F charged into the duct burner CD may be completely burnt within the duct D. Accordingly, the waste heat boiler B may be of the conventional simple boiler structure. However, when no exhaust gas exists (e.g. when the gas turbine GT is not operating) and it is desired to generate steam to improve the heat-to-electricity ratio, for example, with the conventional system of FIG. 2, an auxiliary combustion chamber, burners, and auxiliary fuel for combustion, and a device for supplying combustion air are separately required since normally the duct burner shown in FIG. 2 is not provided with a device for feeding air for combustion. Consequently, the boiler B must be provided with the auxiliary combustion chamber 3 and will thus have the shape shown in FIG. 4.

Thus, FIG. 4 shows an example of the prior art waste heat boiler which includes both a duct burner CD (as in the FIG. 2 prior art) and an auxiliary combustion chamber 3. Combustion chamber 3 includes an auxiliary burner 4 for burning auxiliary fuel 41. The auxiliary fuel 41, the fuel 7 for the duct burner (CD), and combustion air 42 are fed and burned in the combustion chamber 3, after which they enter the tube chamber having the heat transfer tubes 2 and are exhausted from an exhaust gas outlet 6.

Exhaust gas derived from a heat engine, such as the gas turbine GT, is introduced into the duct burner CD as indicated at 7. The fuel 7 is injected by a burner of the duct burner into the exhaust gas to burn in the form of a flame in the duct burner. To accomplish this, according to the conventional technical concept, a combustion chamber within the duct burner has also required a large space, as is the case with the previously discussed combustion chamber 3 of the boiler, because the flame was prohibited from making contact with the water tubes 1 or the heat transfer tubes 2 of the waste heat boiler B, in order to avoid the possibilities of quenching of the flame and overheating of the water tubes.

SUMMARY OF THE INVENTION

The object of the present invention is to substantially expand the application range of a water heat boiler by satisfying the aforementioned three functions. This is accomplished by utilizing with the waste heat boiler of the invention a boiler having a heat-absorbing water tube furnace-inserted type combustion chamber covered by a patent application filed by one of the present applicants, and by integrating a duct burner with an auxiliary burner at the entrance duct to the boiler thereby remarkably miniaturizing the present arrangement as compared with the conventional arrangements.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE PREFERRED EMBODIMENTS

Figure 1:
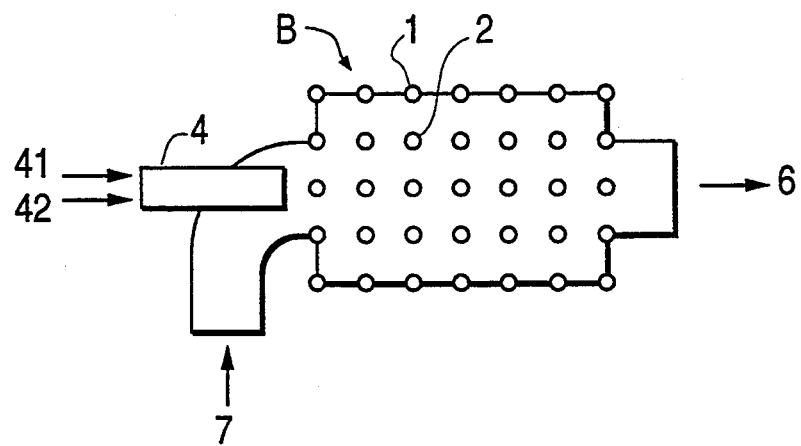
FIG. 1 is a schematic sectional view of a boiler embodying the present invention.

The present invention relates to a waste heat recovery method for use with a cogeneration or combined cycle system, which effects generation of heat of steam and power, heat recovery, full firing of exhaust gas and new (or auxiliary) burning. These functions can be performed simultaneously or independently due to the installation of a heat-absorbing water tube furnace-inserted combustion chamber in a waste heat boiler.

By taking advantage of the achievements disclosed in Japanese Patent Laid-Open Publication Nos. Hei 2-27220 (corresponding to U.S. Pat. No. 5,020,479) and 2-178502 (corresponding to U.S. Pat. No. 5,050,541) which were invented by one of the applicants for the present invention, it has become possible to reduce the size of the boiler itself to as small as $\frac{1}{3}$-1/5 of the size of the conventional boilers by eliminating the auxiliary chamber 3, while still allowing the required three functions including auxiliary burning to be carried out.

Specifically, with reference to FIGS. 1A and 1B the present invention includes a waste heat recovery boiler B having outer walls covered by a heat insulating material 12, and which includes an upper drum 13, a steam outlet nozzle 14, and a lower drum 16. Reference numeral 15 denotes a water surface in the upper drum 13. A heat-absorbing water tube furnace-inserted type combustion chamber is provided in the waste heat recovery boiler B and has heat-absorbing water tubes extending therethrough. The water tubes include both inner tubes 2, and wall tubes 1 with tube fins 11.

The waste heat recovery boiler B is adapted to be operably connected to a heat engine, such as a gas turbine (not shown in FIGS. 1, but depicted in prior art FIG. 2), so that waste gases 7 exhausted from the heat engine are introduced through an exhaust gas entryway into the heat-absorbing water tube furnace-inserted type combustion chamber of the waste heat recovery boiler B. Auxiliary fuel 41 can be introduced into the heat-absorbing water tube furnace-inserted type combustion chamber by an auxiliary burner device 4 in order to cause full firing (complete combustion) of the exhaust gases 7 amongst the water tubes 1, 2 in the combustion chamber. In order to cause auxiliary burning in the combustion chamber even when little or no exhaust gases are being introduced into the combustion chamber (for example, due to shut-down of the heat engine creating the exhaust gases), auxiliary air 42 is also introduced into the combustion chamber. Reference numeral 6 represents the exhaust from the combustion chamber of the waste heat recovery boiler B.

That is, according to the present invention, the large space normally required for the auxiliary combustion chamber is not required. Rather, a heat-absorbing water tube furnace-inserted combustion chamber in which the fuel is to be burnt (i.e. amongst the heat-absorbing water tubes the is employed. In this manner, not only is the boiler itself notably miniaturized as compared with the conventional exhaust-gas fully fired type boilers, but the combustion of the boiler is kept at a uniformly constant temperature due to heat release or absorption by the water tubes. Therefore, it becomes possible to cause combustion while significantly reducing the generation of $NO_x$ and suppressing the formation of CO and unburnt hydrocarbons (UHC), as well as improving heat absorption. Thus, the present invention can substantially improve the overall heat-to-electricity ratio while satisfying the aforementioned three functions of heat recovery, full firing of exhaust gas, and auxiliary burning.

The present invention will now be described with reference to the accompanying drawings.

Figure 4:
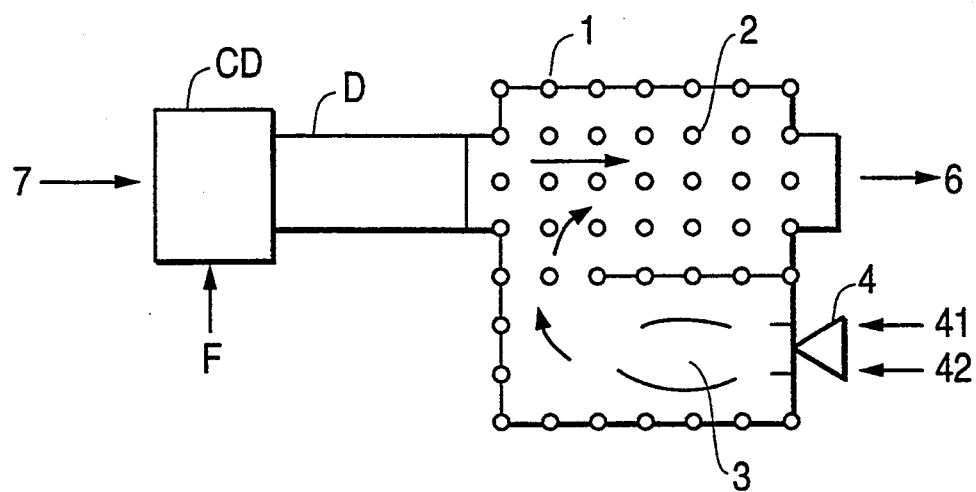
FIG. 4 is a schematic sectional view illustrating a conventional boiler which functions to provide exhaust gas heat recovery, full firing of exhaust gases and auxiliary burning.
Figure 2:
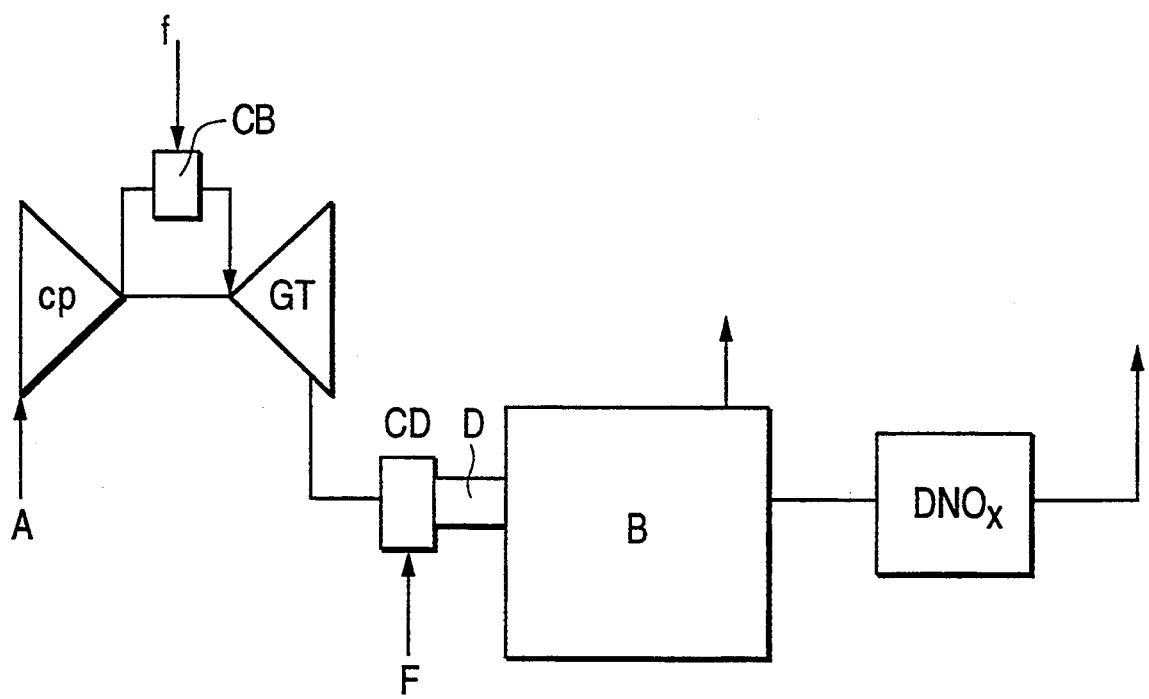
FIG. 2 is a flowchart of a conventional gas turbine in a heat engine used in a conventional cogeneration system or combined cycle system.
Figure 3:
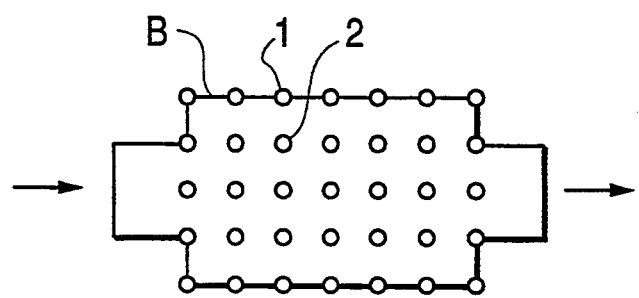
FIG. 3 is a schematic sectional view illustrating a conventional boiler as schematically depicted in FIG. 2.

The conventional exhaust-gas fully fired type boiler such as shown in FIGS. FIG. 4 is replaced by a heat-absorbing water tube furnace-inserted combustion chamber (or a tube-nested combustion chamber) in such a manner as to result in, for example, a structure as shown in FIG. 1, thereby enabling the boiler to be highly simplified and smaller in size.

Comparison of the boiler shown in FIG. 1 with the conventional boiler shown in FIG. 4 makes clear that in the present invention the duct burner CD and the burner 4 of FIG. 4 are combined and located near the entrance of the boiler, and the long duct D and the combustion chamber 3 of FIG. 4 are eliminated.

As discussed above, conversion of the exhaust-gas fully fired type boiler into the simplified structure of the present invention as shown in FIG. 1, utilizes features of the aforementioned Japanese Patent Laid-Open Publications Nos. Hei 2-272207 (corresponding to U.S. Pat. No. 5,020,479) and 2-178502 (corresponding to U.S. Pat. No. 5,050,541). Accordingly, the present invention is a modification of these prior patents.

The effects of the invention may be summarized as follows.

By use of the boiler of this invention, it has become possible to satisfy the three functions of recovering heat for exhaust gas, full firing of the exhaust gas, and auxiliary burning in a waste heat boiler of a conventional cogeneration system or a combined cycle system, while providing a simplified and miniaturized structure which occupies a smaller space. Accordingly, concomitant with the reduced price and the large expansion in the heat-to electricity ratio achieved by this invention, its application range has been greatly extended, as from hotels or petroleum refineries to offices or cement factories or the like.

Although the present invention has been fully described by way of example with reference to the accompanying drawings, it is to be noted here that various changes and modifications will be apparent to those skilled in the art. Therefore, unless such changes and modifications otherwise depart from the scope of the present invention as defined by the appended claims, they should be construed as included therein.

What is claimed is:

1. A method of waste heat recovery in a waste heat recovery boiler arranged to recover waste heat from a heat engine in a cogeneration or a combined cycle system, said method comprising:

providing a heat-absorbing water tube furnace-inserted inserted type combustion chamber in the waste heat recovery boiler, said heat-absorbing water tube furnace-inserted type combustion chamber having heat-absorbing water tubes extending therethrough for recovering waste heat produced by the heat engine;

providing an exhaust gas entryway, having an exhaust gas entrance, for entry of the exhaust gases into the heat-absorbing water tube furnace-inserted type combustion chamber of the waste heat recovery boiler from the heat engine;

mounting an auxiliary burner device to said heat-absorbing water tube furnace-inserted type combustion chamber in such a manner that said auxiliary burner device is separate of said exhaust gas entrance and is mounted to said heat-absorbing water tube furnace-inserted type combustion chamber in a location such that said exhaust gas entrance confronts said auxiliary burner device for introducing auxiliary fuel into the heat-absorbing water tube furnace-inserted type combustion chamber, said auxiliary burner device being mounted so as to allow for both fully combusting the exhaust gases and providing auxiliary combustion amongst the heat-absorbing tubes in the heat-absorbing water tube furnace-inserted type combustion chamber; and providing an auxiliary air inlet for introducing auxiliary air into the heat-absorbing water tube furnace-inserted type combustion chamber for supporting the auxiliary combustion even when little or no exhaust gases are being introduced into the heat-absorbing water tube furnace inserted type-combustion chamber through the exhaust gas entryway.

2. A method as recited in claim 1, wherein the exhaust gas entryway is undivided such that the exhaust gases are introduced into the heat-absorbing water tube furnace-inserted type combustion chamber along a single flow path which passes by the auxiliary burner device.

3. A waste heat recovery apparatus for use in recovering waste heat from exhaust gases from a heat engine in a cogeneration or a combined cycle system, comprising:

a waste heat recovery boiler;

a heat-absorbing water tube furnace-inserted type combustion chamber provided in said waste heat recovery boiler, said heat-absorbing water tube furnace-inserted type combustion chamber having heat-absorbing water tubes extending therethrough for recovering waste heat produced by the heat engine;

an exhaust gas entryway, having an exhaust gas entrance, for entry of the exhaust gases into said heat-absorbing water tube furnace-inserted type combustion chamber from the heat engine;

an auxiliary burner means for introducing auxiliary fuel into said heat-absorbing water tube furnace-inserted type combustion chamber and being mounted so as to allow for both fully combusting the exhaust gases and providing auxiliary combustion amongst said heat absorbing water tubes in said heat-absorbing water tube furnace-inserted type combustion chamber, said auxiliary burner means being mounted to said heat-absorbing water tube furnace-inserted type combustion chamber in such a manner as to be separate of said exhaust gas entrance and mounted to said heat-absorbing water tube furnace-inserted type combustion chamber in a location such that said exhaust gas entrance confronts said auxiliary burner device; and an auxiliary air inlet mounted to said heat-absorbing water tube furnace-inserted type combustion chamber for introducing auxiliary air into said heat-absorbing water tube furnace-inserted type combustion chamber for supporting the auxiliary combustion even when little or no exhaust gases are being introduced into said heat-absorbing water tube furnace-inserted type combustion chamber.

4. A waste heat recovery apparatus as recited in claim 3, wherein
said exhaust gas entryway is undivided such that the exhaust gases are introduced into said heat-absorbing water tube furnace-inserted type combustion chamber along a single flow path which passes by said auxiliary burner device.

* * * * *